March 29, 1966 — E. W. McGRANE ETAL — 3,243,764
ELECTRICAL CONNECTOR
Filed April 2, 1964 — 2 Sheets-Sheet 1
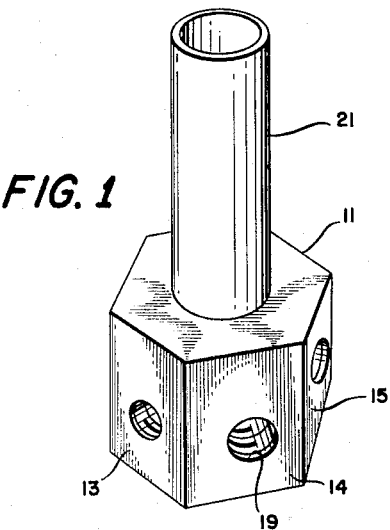
FIG. 1
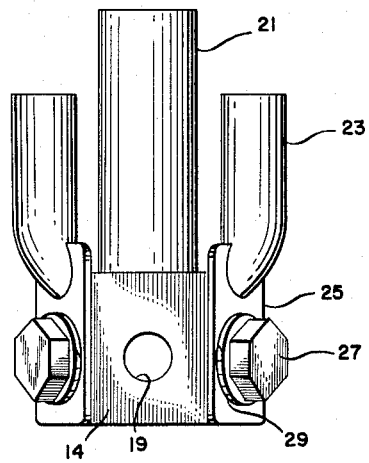
FIG. 2
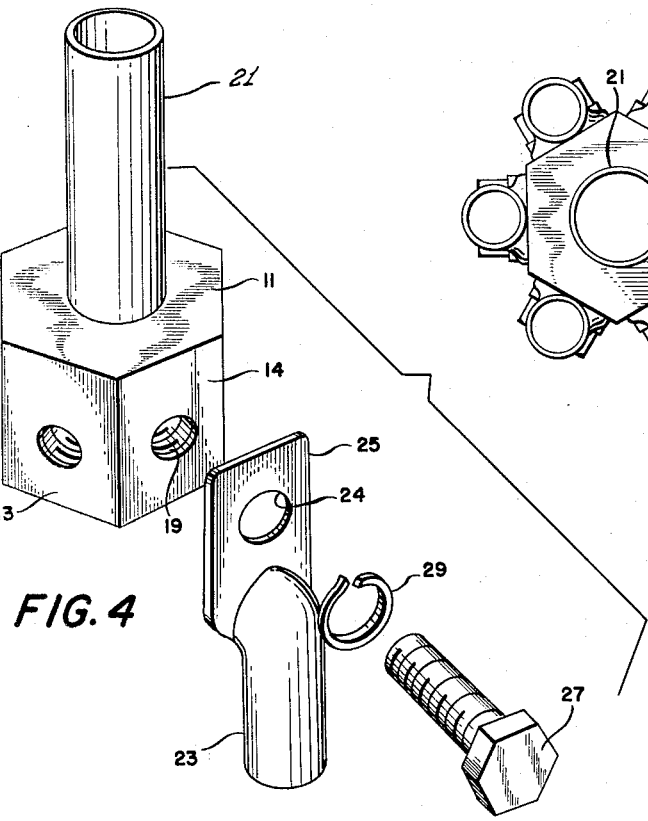
FIG. 3
FIG. 4
INVENTORS
EUGENE W. McGRANE
JOHN J. KLOSIN
BY SCHULZE, BLAIR & BENOIT
ATTORNEYS March 29, 1966  E. W. McGRANE ETAL  3,243,764
ELECTRICAL CONNECTOR
Filed April 2, 1964  2 Sheets-Sheet 2

INVENTORS
EUGENE W. McGRANE
JOHN J. KLOSIN

BY   SCHULZE, BLAIR & BENOIT

ATTORNEYS

United States Patent Office 3,243,764
Patented Mar. 29, 1966

3,243,764
ELECTRICAL CONNECTOR
Eugene W. McGrane, 887 Colonia Road, Elizabeth, N.J., and John J. Klosin, 32 Colburn Road, East Brunswick, N.J.
Filed Apr. 2, 1964, Ser. No. 356,731
4 Claims. (Cl. 339—242)

This invention relates generally to electrical connectors and more specifically to compact electrical connectors having an input thereto with branch outputs therefrom.

At the present time many electrical utilities are becoming more and more concerned with underground residential wiring for a number of reasons. Appearance is vitally important with the increased demand from the user that the unsightly and objectionable utility poles be eliminated from the neighborhood. Maintenance also becomes a factor in that underground wiring is unaffected by storms and other severe weather and is only rarely a target for lightning strokes. A further reason is an economic one. It is well known that in the past electric utilities and telephone companies have shared common utility poles for extension of their services. This meant that the cost of erecting and maintaining these poles was shared equally by the two utilities. However, telephone companies have been favoring underground wiring and have been installing many more underground wiring facilities. Therefore, they no longer jointly use the utility overhead service and the cost to the electric utility is increased substantially.

One of the prime factors in restricting the number of underground services to date has been the relative cost of underground services as opposed to overhead services. At the present time, underground service is considerably more expensive than the overhead service as far as the cost of installation is concerned.

Costs have been reduced greatly through the last several years by superior construction equipment and techniques and through the use of materials designed specifically for underground residential use rather than merely being adapted to that use.

However, where electrical connectors and associated equipment such as insulators are concerned, little progress has been recorded. Connectors now being used for these underground services are those which were primarily manufactured for overhead use. Insulating means in use in underground terminals are often ordinary terminal boards simply borrowed from the inside wiring industry.

A need for a system of terminating buses designed for underground use and adaptable to all present forms of wiring is needed to reduce the cost of underground service.

Accordingly, it is an object of the present invention to provide a universal type connector which may be used for any purposes required for underground wiring connecting systems and which is economical to manufacture and requires a minimum of space when in use.

This and other objects will become apparent from the following description when taken in conjunction with the drawings wherein:

FIG. 1 is a perspective view of one of the preferred forms of the present invention;

FIG. 2 shows the basic connector of FIG. 1 with branch connectors attached thereto;

FIG. 3 is a plan view of the connector of FIG. 1 showing the multiple attachment of the branch connectors;

FIG. 4 is an exploded view showing the method of attaching a branch connector to the basic connector of FIG. 1;

Figure 5:
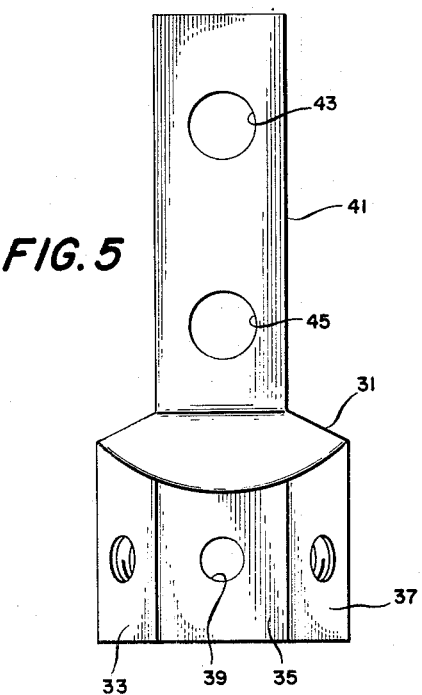
FIG. 5 is a modified version of the present connector base.

Turning now more specifically to the drawings, there is shown in FIGS. 1, 2 and 3 a basic electrically conductive block member 11 having a plurality of faces 13, 14 and 15 about the circumference thereof and being formed so as to have two substantially parallel flat faces. Accordingly, in the particular form shown in FIG. 1 the basic conductive block 11 takes a form similar to a solid hexagonal form.

Each of the faces 13, 14 and 15 have drilled therein a threaded borehole 19. Extending from one face of the block 11 is a connector such as a hollow cylinder 21 which preferably is formed integrally with the block 11.

In FIG. 2 the connector is shown for use in underground service wherein the cylinder 21 may be connected by a solid bus line (not shown) to a secondary output of the transformer with branch connectors or lugs 23 secured to the block 11 by means of a nut 27 and lock washer 29 which hold the integral shoe 25 of the lug substantially flat and secure against each face of the multi-faced block 11.

FIG. 3 shows a plan view wherein each of the peripheral faces of the block 11 has a branch connector attached thereto whereby, in this instance, one connector provides six separate branch house services.

FIG. 4 shows an exploded view of the basic connector with the lug reversed so as to provide an underground service residentially to the houses from the main overhead service coming from the pole. It may be seen that the branch connector 23 has a shoe 25 which abuts against the face 14. The shoe has a borehole 24 therethrough which matches the threaded borehole 19 in the block 11, and the bolt 27 and lock washer 29 hold the branch connector securely in place.

The particular connector shown in FIGS. 1–4 would require a certain modification of the transformers presently in use so that the connections is provided by a solid bus bar leading directly out of the transformer to cylindrical connector 21. Although such modification would be desirable, there is shown in FIG. 5 a connector modified so as to be adaptable to present transformer systems.

Figure 6:
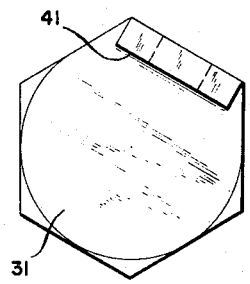
FIG. 6 is a plan view of the connector of FIG. 5.

In the present systems, a long copper pad called a "spade" issues from each secondary insulator transformer. Terminals are installed and holes provided in this pad. FIGS. 5 and 6 show a basic conductive block 31 having multiple faces 33, 35 and 37 with threaded boreholes 39 therein. A substantially flat arm 41 extends upwardly and is integral with the block 31 and is substantially an extension of one of the faces of the block 31. Arm 41 has a plurality of boreholes 43 and 45 therethrough which will match the holes provided in the spade so that the terminal block 31 may be mounted directly to the spade and the branch connectors then mounted to the block as described in connection with FIGS. 1 through 4.

Figure 8:
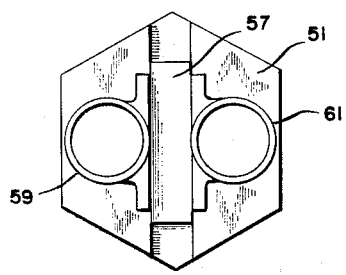
FIG. 8 is a bottom view of the connector shown in FIG. 7.
Figure 7:
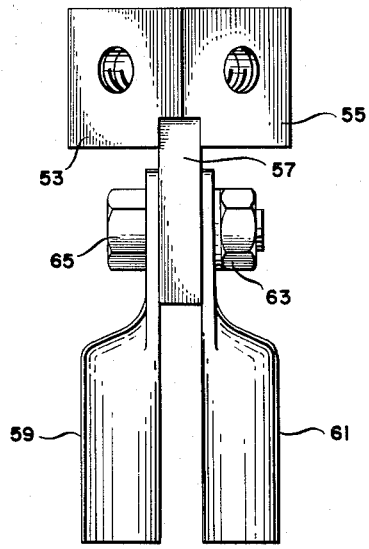
FIG. 7 shows a further modification of the connector of the present invention.

FIGS. 7 and 8 illustrate the further versatility of the connector of the present invention. In this case the connector is designed so as to provide branch services from a continuous supply service. The block 51 is again provided with multiple faces 53 and 55 having the necessary threaded boreholes therein. An arm 57 extends centrally down from one face of the block 51. This arm may either be formed integrally with the block or welded within a slot provided in the face of the block. The main service input, for example connector 59, and takeoff connector 61 are both then bolted to the arm 57 by means of a bolt 63 and nut 65 or the like and, in this manner, a series of service blocks may be provided along a run of a main supply.

It will now be obvious that many modifications of the connector of the present invention may be provided without departing from the scope of the present invention. One such obvious modification would be to furnish a continuous run through the connector by providing a main service tube or arm on both faces of a hub such as shown in FIG. 1. This would be a particularly useful connector arrangement for "hand hold" applications for providing a junction which is connected and then buried in the ground.

It is also obvious that the number of faces provided with the threaded boreholes may be varied in accordance with the particular requirements of the installation. The material may be any conductive element or alloy which is normally used in connectors such as copper, aluminum or the like.

Many advantages accrue from the use of the connector of the present invention. Valuable space is conserved and therefore transformer cabinet size may be considerably reduced. If the transformer is modified in the manner suggested above, it would eliminate the problems involved with the use of the transformer spade. Also, because the branch conductors are arranged in a concentric pattern they are readily insulated with means such as a tubular sleeve which may be slotted to override the transformer connection or other connection.

Accordingly, this invention is to be limited only by the scope of the following claims.

We claim:
1. An electrical terminal comprising
   a block of electrically conductive material,
   a plurality of flat faces about the circumference of said block so as to form a multiple faced bus,
   a threaded borehole in each of said faces, and
   an electrically conductive hollow cylinder integral with said block and extending outwardly from said block.
2. The terminal of claim 1 further comprising
   a plurality of lugs, and
   bolt means for securing one of said lugs to each of said flat faces.
3. An electrical connector comprising
   an electrically conductive block having opposed substantially parallel surfaces,
   a plurality of flat faces about the perimeter of the block, said faces extending between said parallel surfaces so as to form a multiple faced bus,
   a threaded borehole in each of said faces, and
   an electrically conductive hollow cylinder integral with and extending outwardly from one of said surfaces.
4. The connector of claim 3 further comprising a plurality of lugs, and
   bolt means mating with said threaded boreholes for securing one of said lugs to each said flat faces.

References Cited by the Examiner
UNITED STATES PATENTS

| | | | |
|---|---|---|---|
| 1,552,619 | 9/1925 | Klugh | 339—272 |
| 2,195,630 | 4/1940 | Papp et al. | 339—94 X |

FOREIGN PATENTS

| | | |
|---|---|---|
| 477,946 | 10/1951 | Canada. |
| 217,338 | 6/1924 | Great Britain. |
| 401,773 | 1/1943 | Italy. |

PATRICK A. CLIFFORD, *Primary Examiner.*

P. TEITELBAUM, *Assistant Examiner.*